United States Patent
Ike et al.

(10) Patent No.: US 8,135,172 B2
(45) Date of Patent: Mar. 13, 2012

(54) IMAGE PROCESSING APPARATUS AND METHOD THEREOF

(75) Inventors: Tsukasa Ike, Tokyo (JP); Yasukazu Okamoto, Akashi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 12/423,204

(22) Filed: Apr. 14, 2009

(65) Prior Publication Data

US 2009/0262981 A1    Oct. 22, 2009

(30) Foreign Application Priority Data

Apr. 22, 2008  (JP) ................. 2008-111145

(51) Int. Cl.
 *G06K 9/00*  (2006.01)
 *H04N 5/225*  (2006.01)
 *H04N 1/40*  (2006.01)
(52) U.S. Cl. ............... 382/103; 348/169; 358/448
(58) Field of Classification Search .............. 382/103, 382/107, 162, 190, 219, 220, 235, 236, 270, 382/307, 309; 358/3.23, 448, 462, 488, 530; 348/169, 170, 171, 172
See application file for complete search history.

(56) References Cited

U.S. PATENT DOCUMENTS

| 7,054,850 | B2 * | 5/2006 | Matsugu ............... 706/48 |
| 7,227,973 | B2 * | 6/2007 | Ishiyama ............... 382/103 |
| 7,630,539 | B2 * | 12/2009 | Ikeda et al. ............ 382/154 |
| 2002/0102024 | A1 | 8/2002 | Jones et al. |

OTHER PUBLICATIONS

Matthews, et al, The Template Update Problem, IEEE Transactions on Pattern Analysis and Machine Intelligence, vol. 26, No. 6, pp. 810-815, Jun. 2004.

* cited by examiner

*Primary Examiner* — Abolfazl Tabatabai
(74) *Attorney, Agent, or Firm* — Turocy & Watson, LLP

(57) ABSTRACT

An image processing apparatus estimates an estimated object region including an object on an input image on the basis of a stored object data, obtains a similarity distribution of the estimated object region and peripheral regions thereof by at least one classifier, and obtains an object region coordinate and a template image on the basis of the similarity distribution.

7 Claims, 2 Drawing Sheets

IMAGE PROCESSING APPARATUS AND METHOD THEREOF

CROSS-REFERENCE TO RELATED APPLICATION

This application is based upon and claims the benefit of priority from the Japanese Patent Application No. 2008-111145, filed on Apr. 22, 2008; the entire contents of which are incorporated herein by reference.

FIELD OF THE INVENTION

The present invention relates to an image processing apparatus configured to detect and track an object whose image appearance changes with time from a time-series image shot by a shooting apparatus and a method thereof.

DESCRIPTION OF THE BACKGROUND

Many technologies for tracking a moving object using a time-series image shot by a CMOS camera or the like are proposed.

In a tracking of an object, it is important to obtain a region in a certain image which corresponds to a region where the object is present (hereinafter, referred to as an "object region") in a next image accurately in a time-series image. As one of most general methods to obtain the corresponding object region, a template matching is exemplified.

In the template matching, an image in the object region detected in a certain image, or an image obtained by applying a predetermined processing is stored as a template image, and in a subsequent image, a region which is most similar to the template image is calculated by a predetermined method such as SAD, and the calculated region is determined as the object region.

When an appearance of the object to be tracked is not changed in a shot image, there exists a region which matches the template image completely in the subsequent image, a region where the object actually exists is accurately calculated by this method. However, in general, the appearance of the object in the shot image changes gradually due to factors such as a rotation of the object, a change in shape, and a change of a distance from a shooting apparatus. Therefore, the calculated object region does not necessarily match the region where the object actually exists. Therefore, in order to calculate the object region accurately by the template matching, it is important to reduce the difference between the template image and an appearance of the object to be tracked on the image to be processed.

In general, since the difference between the template image and the image in the object region increases with time since the template image is stored, it is preferable to set the difference between a time when the template image is stored and a time when the image to be processed is shot to a small value. Therefore, updating the template image on the basis of the image in the object region detected on the image to be processed is contemplated. However, there arises a problem of generation of displacement between the region to be stored as the template image and the region where the object actually exists due to an accumulation of errors of the object region generated by the change in appearance of the object in the shot image.

Therefore, in "The Template update Problem" I. Matthews, et al., IEEE Trans., Pattern Analysis and Machine Intelligence, Vol. 26, No. 6, June 2004, the displacement of the regions stored as the template images is reduced by storing an image in an object region as an initial template image when starting tracking an object, and verifying the template image by using a result of the template matching using the initial template image when updating the template image to correct the template image.

In contrast, in recent years, as shown in USP No. 2002/0102024, many object detecting apparatuses configured to detect an object stably even with an individual difference of the object or variations in background of the object or illuminating conditions are disclosed. By detecting an object in an image using these object detecting apparatuses and detecting a certain range in a next image considering an object detecting position, an object moving velocity, and so on, the object can be tracked even when an appearance of an object in an image changes as long as it is within a range to be detected of the object detecting apparatus.

However, in the technology disclosed in I. Matthews, et al., since an image when the tracking has started is used for verifying whether the image stored as the template image is actually the object to be tracked or not, the verification of the template image cannot be performed adequately when the appearance of the object on the shot image is significantly different from the time when the tracking has started, whereby there arises such a problem that the tracking of the object is difficult.

Also, in the tracking by the object detecting apparatus, although the tracking is achieved when the change in appearance of the object to be tracked is within the detecting range of the object detecting apparatus, the region to be detected varies significantly depending on the appearance of the object, a background, or the illuminating conditions, whereby there arises a problem that a positional accuracy of the detected object region is lower than the template matching.

SUMMARY OF THE INVENTION

In view of such problems as described above, it is an object of the invention to provide an image processing apparatus configured to be able to track an object to be tracked at a high positional accuracy even when an appearance on an image is significantly changed and a method thereof.

According to embodiments of the invention, there is provided an image processing apparatus that tracks an object present in respective images in a time-series image including: an image input unit configured to input the time-series image; a storage unit configured to store object data including object region coordinates which indicate positions of object regions including the object from past images in the time-series image which is images before an input image and a template image for recognizing the object by a template matching; an estimating unit configured to perform the template matching for the input image using the object region coordinate of the object data and the template image and estimate an estimated object region which is a region where the object is present; a similarity generating unit configured to calculate similarities which indicate probabilities of presence of the object using at least one classifier respectively for the estimated object region and a plurality of peripheral regions of the estimated object region; and a determining unit configured to determine the object region and the object region coordinate in the input image on the basis of a distribution range having a higher similarity than a threshold value in a similarity distribution including the respective similarities, generate the template image from a partial image in the object region, and replace and updates the object region coordinate and the template image in the past image by the object region coordinate and the template image in the input image.

According to the invention, an object can be tracked at a high positional accuracy even when an appearance of the object is significantly changed on an image.

DETAILED DESCRIPTION OF THE INVENTION

Figure 1:
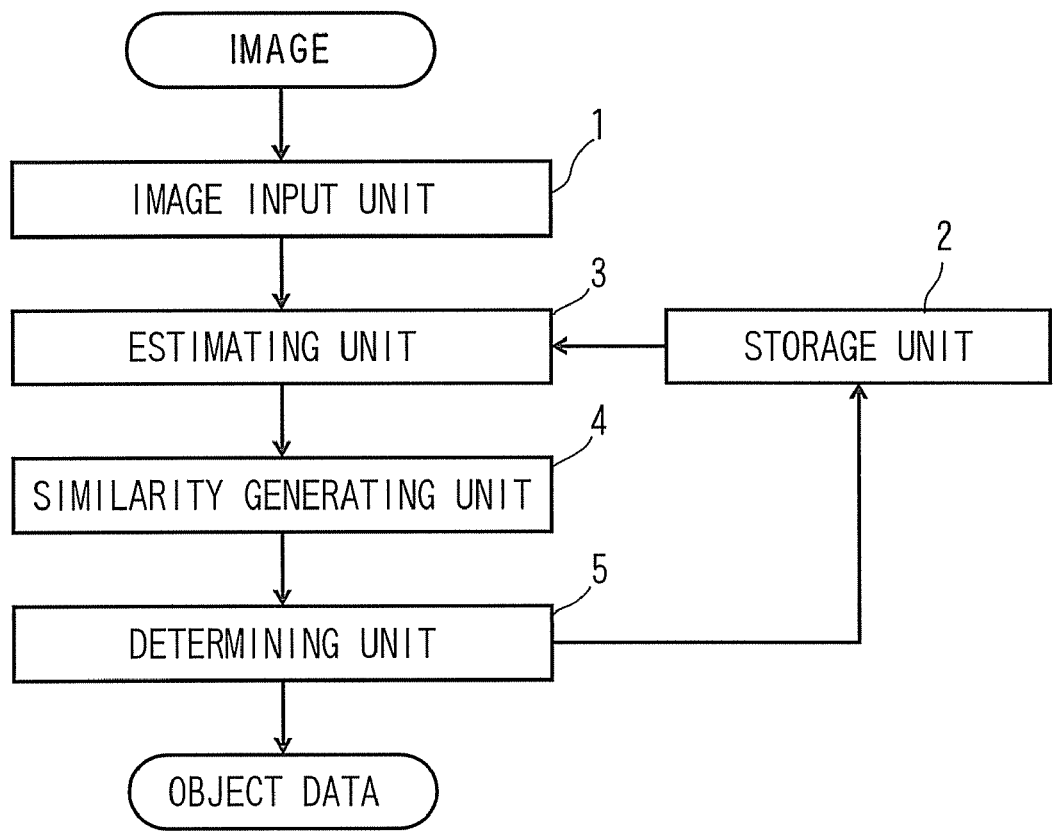
FIG. 1 is a drawing showing a configuration of an image processing apparatus according to a first embodiment of the invention.

Referring now to the drawings, an image processing apparatus as an object tracking apparatus according to an embodiment of the invention will be described below.

Referring now to FIG. 1 to FIG. 4, the image processing apparatus according to the embodiment will be described.

FIG. 1 is a block diagrams showing a configuration of the image processing apparatus according to the embodiment.

As shown in FIG. 1, the image processing apparatus includes an image input unit 1, a storage unit 2, an estimating unit 3, a similarity generating unit 4, and a determining unit 5.

The image input unit 1 shoots a time-series image (moving image) of an object to be tracked using a shooting apparatus such as a CMOS video camera, and supplies the same to the estimating unit 3. In the embodiment, a hand of a human being is used as the object to be tracked.

The storage unit 2 stores object data obtained in past images in the time-series image, and supplies the same to the estimating unit 3.

The estimating unit 3 estimates a region where the object exists on an input image inputted via the image input unit 1 on the basis of the object data stored in the storage unit 2, and outputs the same as an estimated object region.

The similarity generating unit 4 classifies images in the estimated object region and respective peripheral regions by a classifier as means for classifying whether a substance is the object or not in the estimated object region and a plurality of peripheral regions in the periphery thereof on the basis of a predefined standard, and outputs a result of classification and a similarity which represents the likelihood of object as a similarity distribution.

The determining unit 5 determines and outputs an object region coordinate on the basis of the similarity distribution. The determining unit 5 acquires an image in the object region as a template image, and stores the same in the storage unit 2 as the object data together with the object region coordinate.

The functions of the respective members 1 to 5 are also realized by a program stored in a computer.

The object data stored in the storage unit 2 includes a coordinate of the object region in which the hand is present obtained from the past images of the time-series image, image data in the object region, and time data such as a frame number.

The image data may be a gray scale image or a color image. It may also be an image in the object region applied with an image processing such as an edge enhancement processing or the like. The image data in the object region is used as the template image.

In the embodiment, it is assumed that the object data of a newest single frame from which the object data is successfully obtained is stored, but the invention is not limited thereto, and for example, object data of a plurality of past frames may be stored.

Figure 2:
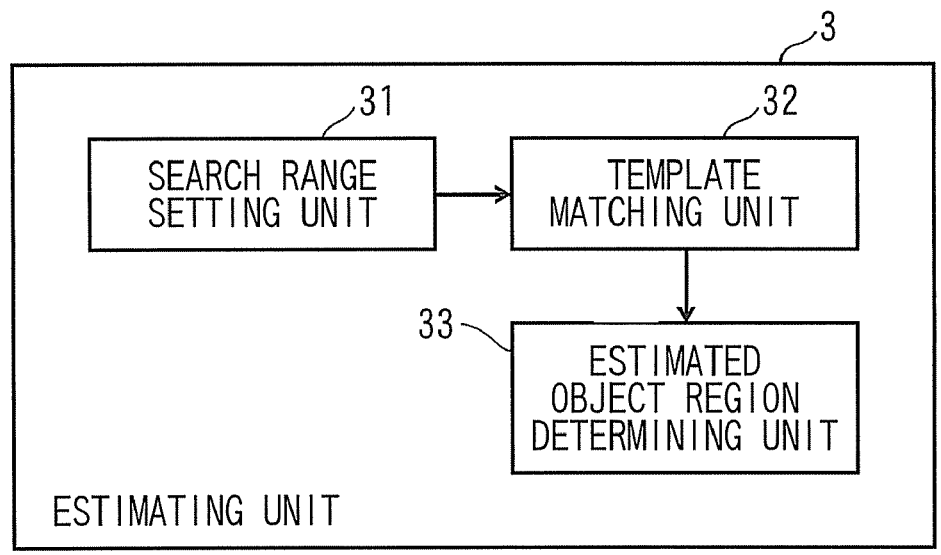
FIG. 2 is a block diagram showing a configuration of an estimating unit.

Referring now to FIG. 2, estimation of the object region in which the hand is present by the estimating unit 3 will be described. The estimating unit 3 includes a search range setting unit 31, a template matching unit 32, and an estimated object region determining unit 33.

The search range setting unit 31 determines a search range on the input image from the object region coordinate and the time data stored in the storage unit 2.

The search range is determined, for example, on the basis of a time of acquisition of the object data stored in the storage unit 2, a position and a size of the object region, and a maximum moving velocity of the object to be tracked.

The template matching unit 32 causes a search window within the search range set by the search range setting unit 31 to be scanned and calculates the similarity of respective partial images in the search window to the template image stored in the storage unit 2 by a template matching. As a method of template matching, generally used methods such as SAD or SSD may be used.

The estimated object region determining unit 33 estimates a region having a highest probability of including the object in the input image on the basis of the similarity of the partial image in the plurality of regions within the search range calculated by the template matching unit 32, and determines the same as the estimated object region.

As an applicable method of determining the estimated object region, the region having a highest similarity may be selected from among the similarities calculated simply by the template matching unit 32 to determine as the estimated object region.

It is also applicable to obtain a probability distribution of the positions of the object on the input image from a moving velocity of the object, and calculate the similarities by assigning weights thereto on the basis of the probability distribution.

Figure 3:
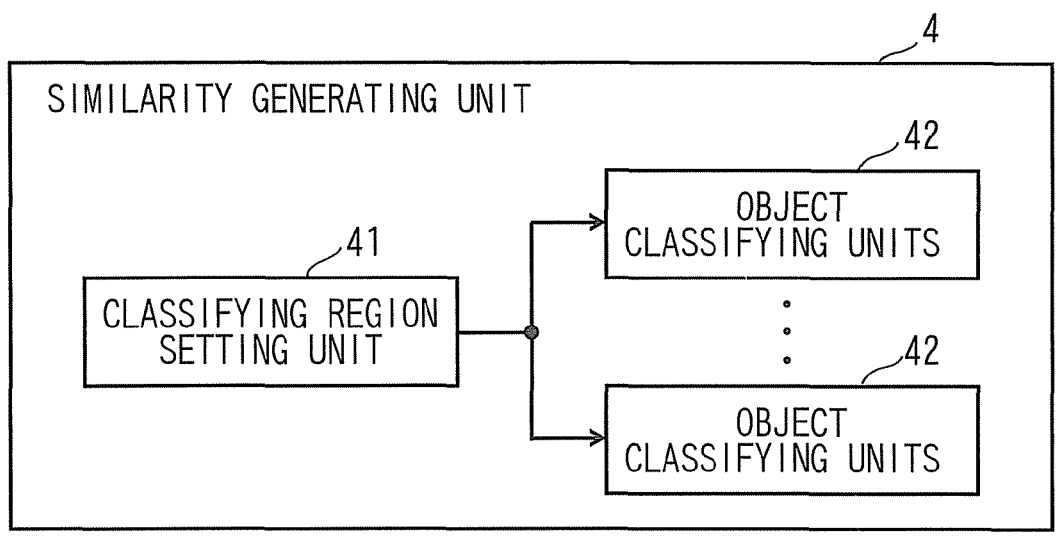
FIG. 3 is a block diagram showing a configuration of a similarity generating unit.

Referring now to FIG. 3, a classification of the object by the similarity generating unit 4 will be described. The similarity generating unit 4 includes a classifying region setting unit 41 and a plurality of object classifying units 42.

The classifying region setting unit 41 sets the object classification region on the basis of the estimated object region outputted from the estimating unit 3.

An example of the setting of the object classification region will be described below.

First of all, object classification regions are set to positions shifted in X-direction and Y-direction equidistantly from the estimated object region as a center region. The object classification regions are set to 25 positions by shifting the regions respectively by $\{-2dw, -dw, 0, +dw, +2dw\}$ in the X-direction and the Y-direction, where w is a size of the estimated object region, and d is a shifted amount of the position of the object classification region.

Since the size of the object region on the image might change by such causes that the distance of the object to be tracked from the shooting apparatus is changed, regions obtained by enlarging and contracting the size of the region by a constant ratio while keeping the center position of the estimated object region constant are also set as the object classification regions.

Regions having respective sizes of $\{w/s, w, sw\}$ are also set as the object classification regions, where s is a size change ratio of the object classification region.

As regards these object classification regions, the object classification regions are set to positions shifted equidistantly in the X direction and the Y direction relative to the sizes of the object classification regions.

In the manner as described above, 75 regions relative to the estimated object region are set as the object classification regions.

The method of setting the object classification region described above is simply an example, and the invention is not limited thereto. For example, the amount of change in position of the region may be changed on a scale of one or three or more, and the amount of change in size of the region may change on a scale of two or more as long as the positions and the sizes of the set object classification regions do not deviated significantly from the estimated object.

The amount of change in position of the region and the amount of change in size might not be constant, and the amount of change in position may be changed by size.

In addition, the object classification region may be set so that the sum of the amounts of change in position in the X-direction and the Y-direction does not exceed a predetermined value.

The object classifying units 42 are classifiers that classify whether the object is the object to be tracked or not on the basis of a predefined standard about the respective object classification regions set by the classifying region setting unit 41, and output the likelihood of object as the similarities (the similarities indicating the probability that the object is present in the image). In other words, the similarity distribution indicating how the similarities of the respective object classifying regions are distributed is outputted.

By employing a method of classifying on the basis of data other than the object data stored in the storage unit 2 as the method of classifying the object used here, the template to be stored in the storage unit 2 is prevented from deflecting from an appearance on the input image from which the object to the tracked can be extracted.

As an example of the method of classification as described above, there is a method of classification used in an object detecting apparatus disclosed in JP-A-2006-268825.

In the above described object detecting apparatus, the object is classified under various environments by selecting a number of luminance patterns that the object to be detected probably has in advance by learning using a number of sample images and evaluating the selected respective luminance patterns in the region to be classified.

Since the luminance patterns used for classification do not change depending on the luminance pattern of the input image given as the object to be detected, if the luminance patterns of the image in the region to be classified are the same, the template does not affect the result of classification.

In general, in the method of classifying the object represented by the method described above, the accuracy of classification is lowered in association with increase in degree of change in appearance of the object to be classified. In contrast, by the provision of a plurality of types of the object classifying units 42 according to the degree of change in appearance of the object as show in FIG. 3, classification of the object with high degree of accuracy is achieved also when the degree of change in appearance of the object is large.

Since the classification of the object is performed only for very limited positions near the estimated object region set by the classifying region setting unit 41, even when the classification is performed by using the plurality of types of the object classifying units 42, the time required for processing is significantly reduced in comparison with a case of tracking using only the object detecting apparatus.

The above-described description is simply an example of the method of classifying the object, and it is not intended to limit the invention. For example, a method of evaluating the similarity of a contour image generated from an input image to a model image or a method of evaluating a pattern similarity of a skin color region of an input image is also applicable.

Figure 4:
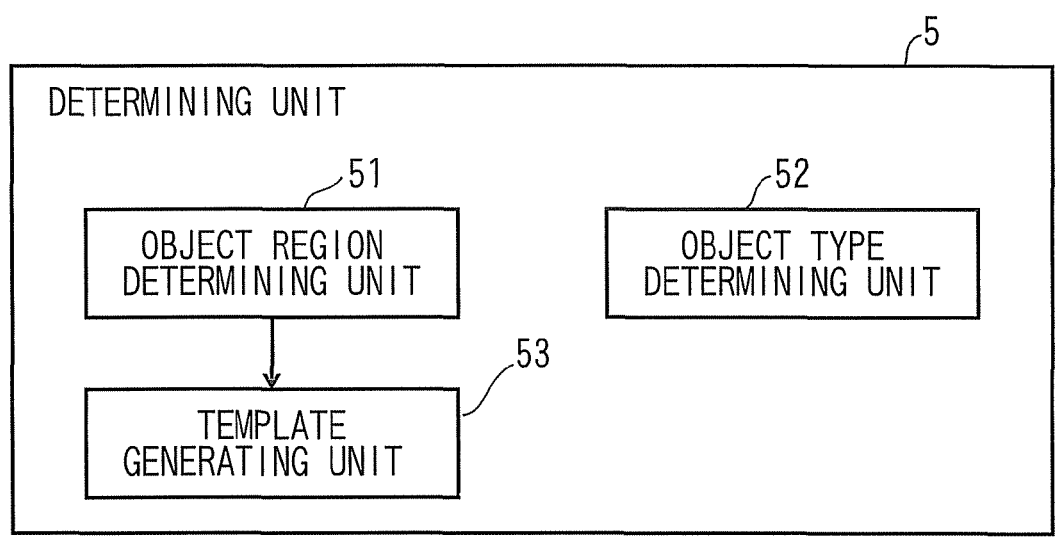
FIG. 4 is a block diagram showing a configuration of a determining unit.

Referring now to FIG. 4, an example of a processing in the determining unit 5 will be described. The determining unit 5 includes an object region determining unit 51, an object type determining unit 52, and a template generating unit 53.

The object region determining unit 51 determines the object region on the basis of the similarity distribution generated by the similarity generating unit 4.

A method of determining the object region determines, for example, by assigning weights to the respective regions which are determined as the objects by the object classifying units 42 according to the similarities on the basis of the similarity distribution generated by the similarity generating unit 4 and calculating an average from the weights.

The object type determining unit 52 determines an object type on the basis of the similarity distribution. The object type here means the shape of the object and, if the object is a hand, it means the shape of the hand in a game of "rock-scissors-paper".

A method of determining the object type determines by calculating a total sum of the similarities in the regions which are determined as the object on the basis of the similarity distribution in one-to-one correspondence with the object type and selecting the object type which shows the largest total sum.

In other words, at least one classifier is provided for each of the different shapes "rock, paper, scissors" of the object. Then, the similarities between the estimated object region and the respective peripheral regions are accumulated for the each classifier. Then, the type of the shape of the object corresponding to the classifier which demonstrates the highest accumulated value is determined as the object type.

The template generating unit 53 generates the template image by extracting a partial region image corresponding to the object region determined by the object region determining unit 51 from the image inputted by the image input unit 1. The template image generated here is stored in the storage unit 2 together with the object region and the object type.

The above-descried description is simply an example of the configuration of the determining unit 5, and the invention is not necessarily limited to the above-described configuration. For example, a configuration in which the object type determining unit 52 is not provided and only the object region determining unit 51 and the template generating unit 53 are provided is also applicable.

As described above, in the image processing apparatus according to the embodiment, the estimation of the object region at a high degree of positional accuracy is achieved by the tracking on the basis of the template matching, an acquisition of adequate object region is achieved by detecting the object in the limited region very near the estimated object region and determining the object region even when the appearance of the object is changed, and a restraint of a background of the object from affecting the result of detection of the object is achieved.

Accordingly, even when the appearance of the object is changed, the object tracking with a high degree of positional accuracy is achieved.

The invention is not limited to the embodiment described above, and may be modified variously without departing the scope of the invention.

For example, the hand of a human being is employed as the object in the embodiment described above, but the invention is not limited thereto, and may be applied to human beings, human faces, human legs, cars, airplanes, vehicles, and other movable objects.

What is claimed is:

1. An image processing apparatus that tracks an object present in respective images in a time-series image comprising:
   an image input unit configured to input the time-series image;
   a storage unit configured to store object data including object region coordinates which indicate positions of object regions including the object from past images in the time-series image which is images before an input image and a template image for recognizing the object by a template matching;
   an estimating unit configured to perform the template matching for the input image using the object region coordinate of the object data and the template image and estimate an estimated object region which is a region where the object is present;
   a similarity generating unit configured to calculate similarities which indicate probabilities of presence of the object using at least one classifier respectively for the estimated object region and a plurality of peripheral regions of the estimated object region; and
   a determining unit configured to determine the object region and the object region coordinate in the input image on the basis of a distribution range having a higher similarity than a threshold value in a similarity distribution including the respective similarities, generate the template image from a partial image in the object region, and replace and update the object region coordinate and the template image in the past image by the object region coordinate and the template image in the input image.

2. The apparatus according to claim 1, wherein the similarity generating unit sets regions having a plurality of sizes in a plurality of positions in a periphery with respect to the position of the estimated object region as the peripheral regions, and
   calculates the similarity to the estimated object region and the similarities to the peripheral regions being different in the position and the size by the at least one classifier.

3. The apparatus according to claim 1, wherein the determining unit calculates a center of gravity by assigning weights to the estimated object region and the respective peripheral regions according to the similarities corresponding thereto on the basis of the similarity distribution, and determines the position of the center of gravity as the position of the object region.

4. The apparatus according to claim 1, wherein the similarity generating unit includes the at least one classifier corresponding respectively to a plurality of different shapes of the object,
   accumulates the similarities of the estimated object region and the respective peripheral regions for the respective classifiers, and
   determines the shape of the object corresponding to the classifier which demonstrates a largest accumulated value as an object type of the object.

5. The apparatus according to claim 1, wherein when it is determined that the object region is not included in the estimated object region and the respective peripheral regions,
   the determining unit determines the object data on the input image on the basis of the object data in the estimated object region and the object data on the past images outputted by the estimating unit.

6. An image processing method comprising:
   inputting a time-series image;
   storing object data including object region coordinates which indicate positions of object regions including an object from past images in the time-series image which is images before an input image and a template image for recognizing the object by a template matching;
   performing the template matching for the input image using the object region coordinate of the object data and the template image and estimating an estimated object region which is a region where the object is present;
   calculating similarities which indicate probabilities of presence of the object using at least one classifier respectively for the estimated object region and a plurality of peripheral regions of the estimated object region; and
   determining the object region and the object region coordinate in the input image on the basis of a distribution range having a higher similarity than a threshold value in a similarity distribution including the respective similarities, generating the template image from a partial image in the object region, and replacing and updating the object region coordinate and the template image in the past image by the object region coordinate and the template image in the input image.

7. An image processing program stored in a non-transitory computer readable media, the program realizing the functions of:
   inputting a time-series image;
   storing object data including object region coordinates which indicate positions of object regions including an object from past images in the time-series image which is images before an input image and a template image for recognizing the object by a template matching;
   performing the template matching for the input image using the object region coordinate of the object data and the template image and estimating an estimated object region which is a region where the object is present;
   calculating similarities which indicate probabilities of presence of the object using at least one classifier respectively for the estimated object region and a plurality of peripheral regions of the estimated object region; and
   determining the object region and the object region coordinate in the input image on the basis of a distribution range having a higher similarity than a threshold value in a similarity distribution including the respective similarities, generating the template image from a partial image in the object region, and replacing and updating the object region coordinate and the template image in the past image by the object region coordinate and the template image in the input image.

* * * * *